United States Patent
Israr et al.

(10) Patent No.: US 9,880,621 B2
(45) Date of Patent: Jan. 30, 2018

(54) GENERATING VIRTUAL STIMULATION DEVICES AND ILLUSORY SENSATIONS USING TACTILE DISPLAY TECHNOLOGY

(75) Inventors: Ali Israr, Monroeville, PA (US); Ivan Poupyrev, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 1573 days.

(21) Appl. No.: 12/976,193

(22) Filed: Dec. 22, 2010

(65) Prior Publication Data
US 2011/0248837 A1    Oct. 13, 2011

Related U.S. Application Data

(60) Provisional application No. 61/322,108, filed on Apr. 8, 2010.

(51) Int. Cl.
*H04B 3/36* (2006.01)
*G06F 3/01* (2006.01)

(52) U.S. Cl.
CPC .................................. *G06F 3/016* (2013.01)

(58) Field of Classification Search
CPC ........................................................ G06F 3/016
USPC .................... 345/173, 174; 340/407.1, 407.2
See application file for complete search history.

(56) References Cited

U.S. PATENT DOCUMENTS

| 8,294,557 B1* | 10/2012 | El Saddik ............... G06F 3/016 340/407.1 |
| 2011/0063208 A1* | 3/2011 | Van Den Eerenbeemd et al. ............................ 345/156 |
| 2011/0148607 A1* | 6/2011 | Zeleny ....................... 340/407.1 |

\* cited by examiner

*Primary Examiner* — Ojiako Nwugo
(74) *Attorney, Agent, or Firm* — Ference & Associates LLC

(57) ABSTRACT

Systems and methods providing tactile displays that present two-dimensional moving tactile stroke sensations are described herein. Systems and methods provide for controlling the characteristics of stimulation devices arranged in a grid topology to generate virtual stimulation devices and illusory sensations. Embodiments provide for the generation of illusory sensations including, but not limited to, continuous linear movement and shapes such as curves, squares, and circles. According to embodiments, a tactile display apparatus is provided that facilitates user interaction with the tactile display. The tactile display apparatus includes an interface embedded with stimulation devices and a control device that controls the operation of the stimulation devices to generate illusory sensations.

24 Claims, 10 Drawing Sheets

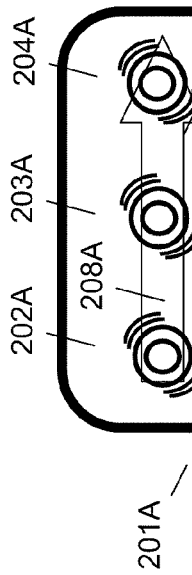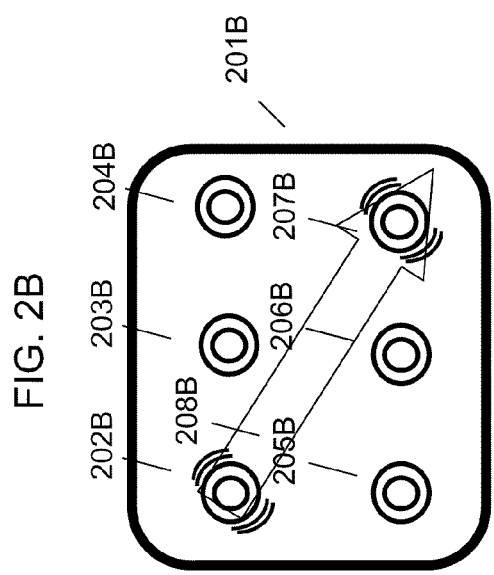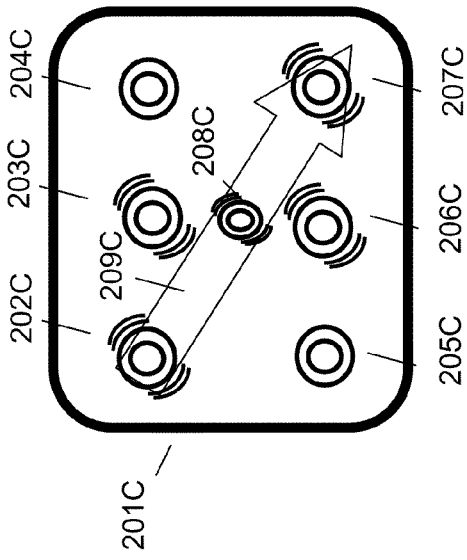

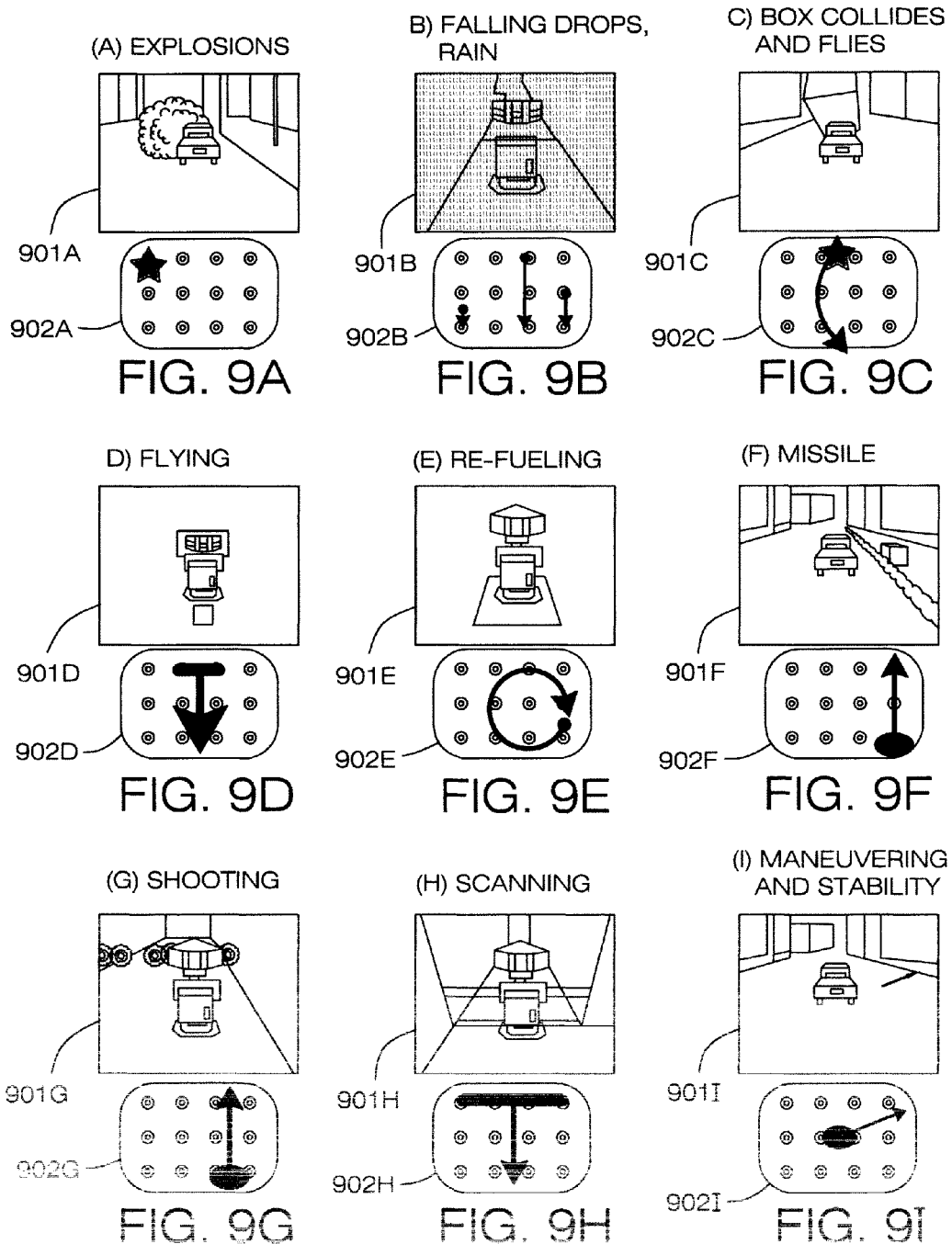

GENERATING VIRTUAL STIMULATION DEVICES AND ILLUSORY SENSATIONS USING TACTILE DISPLAY TECHNOLOGY

CLAIM FOR PRIORITY

The present application claims priority to U.S. Provisional Patent Application Ser. No. 61/322,108 filed Apr. 8, 2010, which is incorporated herein by reference as if fully set forth.

BACKGROUND

The sense of touch provides rich information about the world around us. Evoked by our interactions with objects and materials, it informs us about the texture, roughness, softness, viscosity, elasticity and myriad variations in resistance. Tactile display or haptic technology attempts to produce such sensations through technological devices that interface with users through the sense of touch. In general, a tactile display is comprised of one or more stimulation devices regulated by a controller. A user in contact with the tactile display experiences sensations resulting from vibrations or other forces emanating from the individual stimulation devices. Current tactile display technologies are inadequate for a variety of reasons. Providing tactile display systems with richer and more authentic tactile sensations would greatly enhance user experiences with systems utilizing tactile display technology.

BRIEF SUMMARY

In summary, one aspect provides a method comprising: controlling one or more characteristics of a plurality of stimulation devices configured to generate a sensation of one or more virtual stimulation devices perceivable by a user; generating one or more tactile sensations using the plurality of stimulation devices and the one or more virtual stimulation devices; and controlling the one or more tactile sensations such that the one or more tactile sensations are perceivable by a user at a plurality of positions.

Another aspect provides a system comprising: a plurality of stimulation devices; and one or more control devices configured to: control one or more characteristics of a plurality of stimulation devices configured to generate a sensation of one or more virtual stimulation devices perceivable by a user; generate one or more tactile sensations using the plurality of stimulation devices and the one or more virtual stimulation devices; and control the one or more tactile sensations such that the one or more tactile sensations are perceivable by a user at a plurality of positions.

A further aspect provides a computer program product comprising: a computer readable storage medium having computer readable program code embodied therewith, the computer readable program code comprising: computer readable program code configured to one or more characteristics of a plurality of stimulation devices configured to generate a sensation of one or more virtual stimulation devices perceivable by a user; and computer readable program code configured to generate one or more tactile sensations using the plurality of stimulation devices and the one or more virtual stimulation devices; computer readable program code configured to control the one or more tactile sensations such that the one or more tactile sensations are perceivable by a user at a plurality of positions.

The foregoing is a summary. For a better understanding of example embodiments, together with other and further features and advantages thereof, reference is made to the following description, taken in conjunction with the accompanying drawings, and the scope of the invention will be pointed out in the appended claims.

BRIEF DESCRIPTION OF THE SEVERAL VIEWS OF THE DRAWINGS

FIGS. 2A-2D illustrate example tactile strokes.
FIGS. 9A-9I provide graphics and corresponding actuator configurations for illusory sensations derived from an interactive game experience.

DETAILED DESCRIPTION

Figure 1A:
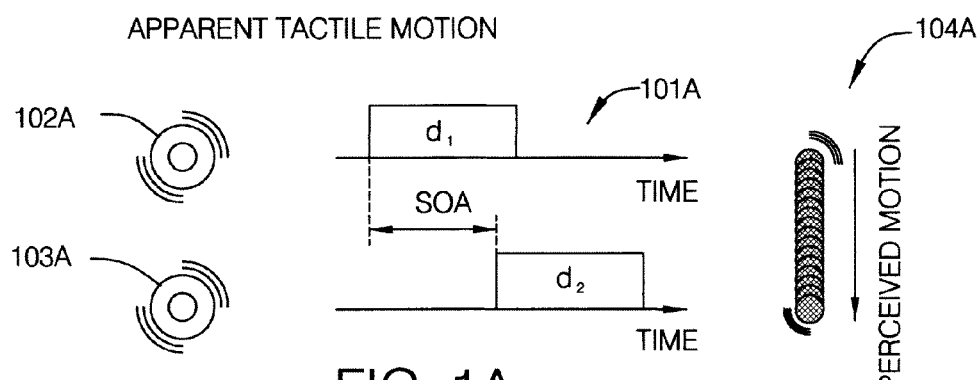
FIGS. 1A-1C illustrate vibrotactile illusions.

Components of the embodiments, as generally described and illustrated in the figures herein, may be arranged and designed in a wide variety of different configurations in addition to the described example embodiments. Thus, the following more detailed description of example embodiments, as represented in the figures, is not intended to limit the scope of the invention, as claimed, but is merely representative of example embodiments. Furthermore, the described features, structures, or characteristics may be combined in any suitable manner in one or more embodiments. In the following description, numerous specific details are provided to give a thorough understanding of embodiments.

Reference throughout this specification to embodiment(s) means that a particular feature, structure, or characteristic described in connection with the embodiment is included in at least one embodiment. Thus, appearances of the phrases "certain embodiments" or "example embodiment" or the like in various places throughout this specification are not necessarily all referring to the same embodiment.

Integrating current technology with tactile display devices may enhance user interactions and expand the user's ultimate experience. For example, augmenting the rich and highly immersive visual and audio effects produced by current entertainment technologies with tactile display technology would enhance the overall entertainment experience and lead to a deeper sense of immersion and believability. In addition, using tactile display technology to provide realistic touch sensations to virtual surgical training systems would generate a more authentic training experience within a more accurate learning environment. Ultimately, tactile display technology may be integrated into a vast array of environments and devices to enhance user interaction and experience, including, but not limited to, automobiles, airplanes, video games, toys, rehabilitation and therapeutic services, vehicle guidance, and computing devices. However, current tactile display technologies can only produce a small fraction of the infinite variety of touch sensations. Providing tactile display systems that enhance the vocabulary of tactile "expressions" would greatly increase the utility and attractiveness of systems utilizing tactile display technology.

Many systems have been created utilizing tactile systems. Examples include mapping speech frequency bands to a series of vibrating devices as a communication aid for the deaf, converting the output from an array of photo sensors into vibrations, encoding sensory meanings into a set of tactile patterns that users could learn and recognize, presenting spatial information with actuator arrays, and force-feedback in highly immersed virtual environments, such as placing motors inside movie theatre seats to display low-frequency subtle motion cues directly taken from movie scenes.

These systems are limited in their ability to provide realistic and natural haptic effects due to limited actuator and controls technologies and due to a lack of psychophysical data for understanding human force and touch perception. Another problem involves providing a tactile platform scalable across multiple configurations and system environments. There has been a rapid development in personal computing technology, including mobile phones, tablet computing, and the integration of computing in clothing and other similar environments. This development has lead to a growing interest in overcoming scaling and platform problems so that user experiences may be enhanced and the quality and interaction potential both in mobile settings and at home may be increased.

Generally, tactile displays can be separated into two broad categories. The first category involves the design of actuation technologies and control techniques needed to produce a microstructure of tactile sensations, including vibration, surface roughness and slipperiness, skin deformation and stretch, and rotational profiles. The second category involves the construction of high-order tactile percepts that can communicate complex meanings, expressions and experiences. The second category includes tactile languages that communicate symbolic information, display images and sounds, communicate alerts and messages in mobile devices, and present spatial information such as directions and shapes. A focus of such tactile display technology is to provide tactile patterns that are expressly discriminated, rapidly processed, and easily learned.

Embodiments described herein provide tactile displays that present two-dimensional moving tactile stroke sensations. The systems and methods described herein provide for controlling the characteristics of stimulation devices arranged in a grid topology to generate virtual stimulation devices and illusory sensations. Embodiments allow for the combination of illusory and non-illusory sensations utilizing the same tactile display hardware. Embodiments provide for the generation of illusory sensations including, but not limited to, continuous linear movement and shapes such as curves, squares, and circles. According to embodiments, a tactile display apparatus is provided that facilitates user interaction with the tactile display. A non-limiting example of a tactile display apparatus is a chair embedded with a grid of actuators such that a user sits in the chair and the actuators interface with the user's back.

Embodiments provide tactile displays that present two-dimensional sensations, including, but not limited to moving tactile stroke sensations and static vibrations. According to embodiments, a tactile stroke is a sensation that: (1) presents continuous and uninterrupted motion, (2) has clear start and end points, (3) cannot be subdivided such that it is perceived as a single tactile unit, and (4) can move with varying velocity across the skin. Moving tactile strokes are one of the most common and richest tactile experiences. Non-limiting examples of common sensations are stroking, rubbing, caressing, the crawling of an insect, scratching, rolling and the brushing of a leaf. An effective tactile stroke display can significantly enhance user experiences and immersion in many interactive scenarios, including games, movies and music.

Tactile strokes can naturally form semantic units. Just as a brush stroke on paper, a tactile stoke "drawn" on the skin can be sensed, recognized and remembered as a single unit. Embodiments provide that the quality of the sensation may be changed by modifying stroke characteristics, including, but not limited to, the frequency, pitch, speed, length, direction, location or intensity of the stroke. In addition, embodiments provide that more than one frequency may be stimulated at one time to create a single stroke and, additionally, for the presentation of several strokes. As such, strokes may communicate information in a compact and efficient manner, resulting in effective and enjoyable information communication displays. In addition, strokes may be used with other haptic feedback systems, including, but not limited to, motion platforms, vibrations, and robotic arms.

Embodiments provide for a two-dimensional (2D) tactile display that integrates a large number of stimulation devices into a seamless and comfortable experience, presenting a variety of sensations with variations in speed, thickness, location and intensity characteristics. Use of the term actuator is common within the haptics field, as such, the terms actuator, tactor, and stimulation device may be used interchangeably herein. Such a 2D stroking tactile display should be robust, work well for any user, accommodate actuators with various characteristics while using a small number of actuators to minimize weight, cost and power consumption. Moreover, in order to be widely deployed, such a 2D stroking tactile display should provide authoring tools that would allow non-programmers to draw tactile strokes on a computer screen and then play them back on a haptic device, save them for later use, and share them with other developers, such as over the Internet.

Embodiments provide for Tactile Brush, an architecture that includes, but is not limited to, a system of control processes derived from psychophysical models capable of creating high-resolution 2D moving tactile trajectories on the skin using low-resolution 2D arrays of vibrating actuators. According to embodiments, the psychophysical models generate two tactile illusions—apparent tactile motion and phantom sensations. Non-limiting examples of sensations provided by the Tactile Brush architecture are: (1) smooth, two dimensional stroking sensations with varying frequency, amplitude, velocity and direction of motion; (2) 2D linear strokes of arbitrary length, direction, location, perceived speed and intensity; curved trajectories; pulsating and continuous strokes; and (3) strokes that change between pulsating and continuous; and several strokes drawn at the same time. Embodiments provide that strokes may be specified by drawing them on a screen using a simple computerized authoring system.

According to embodiments, Tactile Brush is a generic architecture that can be used with any vibrotactile actuators, from inexpensive vibrating motors to military-grade tactors. In addition to actuators, embodiments provide that sensations may be created through any stimulation device or object capable of creating sensations and integrated within the Tactile Brush architecture, including, but not limited to, air nozzles, water sprays, ultrasonic devices, and devices that produce electrotactile sensations, such as electromagnetic and piezoelectric devices. Embodiments further provide that the Tactile Brush architecture may be adapted to various actuator topologies, including, but not limited to, rectangular, square, triangular, circular, and oval topologies. Moreover, embodiments provide that the Tactile Brush architecture may be integrated with various tactile platforms. Non-limiting examples of integrating the Tactile Brush architecture with tactile platforms include embedding it in a chair, such as providing it on the front side of the back of a chair, clothing, vests, belts, sleeves and armbands, patches, gloves, tools, sporting equipment, mobile computing devices such as tablets and mobile phones. In addition, the integration of the Tactile Brush architecture may occur in both individual and collaborative interactive scenarios. Embodiments configure the Tactile Brush architecture to interact with various body locations, including, but not limited to, the back, chest, thighs, hands, neck, tongue, and combinations thereof.

Tactile Brush may be integrated into many different technological platforms. For example, embodiments provide for using Tactile Brush with video game and movie technologies. When integrated with such technologies, dynamic directional stroking sensations may be synchronized with graphic contents to create sensations including, but not limited to, drops of water, the recoil of a gun, the buzzing of insects, and air movement from passing cars. As a non-limiting example, Tactile Brush may be integrated into haptic devices such as the WII video game controller for the WII video game system by Nintendo Company, Limited. Another non-limiting example may involve integrating a tactile platform, such as clothing embedded with a tactile display according to embodiments, capable of interacting with the KINECT video game system for the XBOX 360 video game system by the Microsoft Corporation. In addition, embodiments provide that Tactile Brush may be used with any haptic feedback mechanism capable of integrating with the associated hardware and processes, including, but not limited to, poking devices, friction displays, force feedback devices, and texture displays. Furthermore, embodiments provide for the integration of Tactile Brush with displays of various mediums, including visual displays, audio displays, and combinations thereof.

Embodiments base the Tactile Brush architecture on exploiting vibrotactile illusions, which are perceptual phenomena that arise when two or more vibrotactile actuators are stimulated on the skin. Three well-known vibrotactile illusions are discussed herein as non-limiting examples that form the basis for Tactile Brush according to embodiments. The three vibrotactile illusions are (1) apparent haptic motion, (2) phantom sensation, and (3) saltation. These illusions share the common thread of a perception of a change in the stimuli location when the time relations are manipulated.

Apparent tactile motion is also known as phi-phenomena and occurs when vibrotactile stimuli are placed on the skin in close proximity and their actuation times overlap such that a user does not perceive two actuators, but rather a single actuator moving between them. Variables producing robust apparent tactile motion are: (1) stimuli duration and (2) inter-stimulus onset interval, also called stimulus onset asynchrony, (SOA), which is the time between onsets of subsequent actuations. Embodiments further provide that the distance between actuators may be manipulated, depending on the contact site on the user's body.

An important property of apparent tactile motion is that it produces a sensation of continuous high-resolution tactile motion with a few actuators arranged in discrete and sparse arrays. Previous attempts to design such arrays were limited to producing motion along one-dimensional arrays of actuators. A problem with designing tactile displays based on apparent tactile motion is that there is insufficient understanding of the parameter space where motion exists. The main motivation of previous studies involving such displays was identifying variables that control the illusion by demonstrating a single instance of control values producing apparent motion. However, studied variables did not include how these values would change for different signal frequencies, directions, durations, intensities, body site locations, or how far they can deviate without breaking the illusion of motion. According to embodiments, designing robust tactile displays based on apparent tactile motion requires psychophysical models that define optimal parameter space, where apparent tactile motion is clearly perceived. For example, the distance between actuators on a tactile display according to embodiments may be different for different body contact sites, which, in turn, may depend on the population of receptors and spatial sensitivity of the skin at the contact site.

Phantom tactile sensation, also known as funneling illusion, involves the simultaneous stimulation of two vibrotactile actuators placed in close proximity, creating an illusory vibrating actuator located between the real actuators. The location of the phantom sensation depends on the relative intensity of physical actuators such that if their intensities are equal the sensation will appear at a midpoint between both actuators. Unlike apparent motion, phantom illusion is static such that no motion is perceived. Real actuators are vibrated simultaneously and the intensity of vibration is the variable that controls this illusion.

In addition, phantom illusion allows the placement of a phantom actuator anywhere between physical actuators. As such, embodiments provide methods for predicting the location and intensity of a phantom actuator given the intensities of two real actuators. According to embodiments, the Pacinian weighted power model, or Pacinian energy summation model, may be used for predicting location and intensity of phantom sensation. The Pacinian model according to embodiments is described more fully below. Further embodiments provide that the Pacinian model may connect phantom sensations with general psychophysical models of skin perception. According to embodiments, the Pacinian model may be extended to three or more actuators. In addition, embodiments provide that other models may also be used, including, but not limited to, linear and logarithmic models.

Saltation or "cutaneous rabbit" illusion is generally considered the most popular illusion for designing tactile displays, mostly due to its reliability and simplicity in implementation. Saltation occurs when two vibratory actuators are placed on the skin and two pulses are delivered to the first and then to the second actuator, participants do not feel two double taps at two locations. Instead, they feel single taps in four locations "jumping" from the first to the last actuator with approximately uniform spacing. Saltation is affected by, inter alia, the duration of stimulation, inter-stimulus time interval, spacing of actuators, and stimulating site. Unlike apparent motion, saltation does not elicit the sensation of continuous movement. In addition, unlike phantom illusion, saltation does not create static sensations.

There are many similarities between the tactile illusions discussed previously; however, all illusions are considered unique and are described independently herein. Nonetheless, embodiments provide that the tactile illusions discussed herein may be utilized alone or in combination.

Figure 1B:
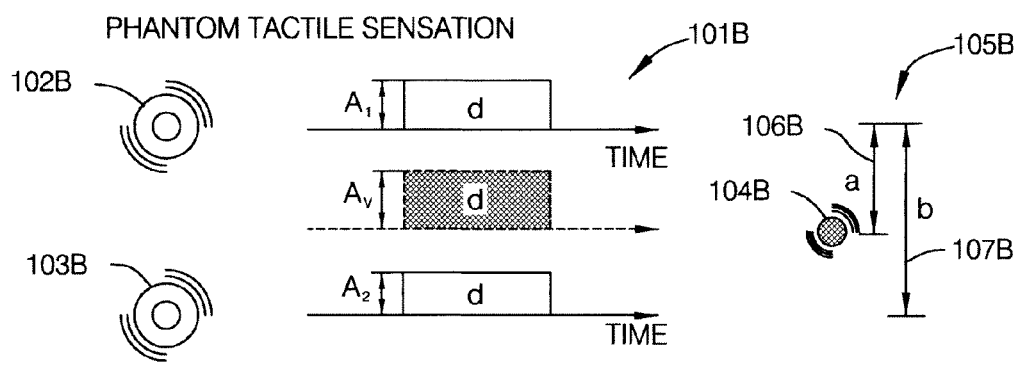
Figure 1C:
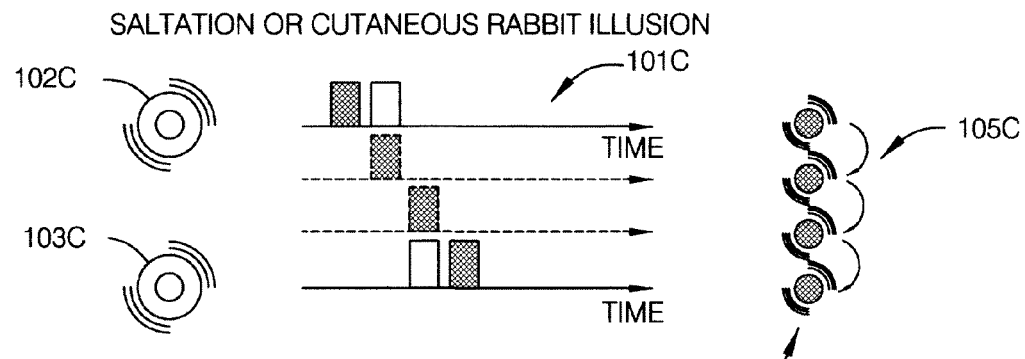

Referring to FIGS. 1A-C, therein is depicted timing diagrams for the apparent tactile motion, phantom tactile sensation, and saltation according to embodiments. FIG. 1A shows the timing diagram 101A for two actuators 102A, 103A and the illusory sensation 104A perceived by a user.

FIG. 1B demonstrates the timing and intensity diagram 101B for two actuators 102B, 103B and the resulting phantom actuator 104B, and the illusory sensation 105B perceived by a user. The depiction of the illusory sensation 105B is comprised of the phantom actuator 104B and distance a 106B and distance b 107B. According to embodiments, distance a 106B is the distance from the center of the illusory actuator 104B to a physical actuator 102B and distance b 107B is the distance between the physical actuators 102B, 103B. In addition, embodiments provide that $A_v$ represents the intensity of the phantom actuator 104B, while $A_1$ and $A_2$ represent the intensities of actuators 102B, 103B, respectively.

FIG. 1C shows the timing diagram 101C for two actuators 102C, 103C and the resulting illusory actuators 104C. The resultant illusory sensation perceived by a user is depicted in 105C. The timing diagrams 101A, 101B, 101C represent the duration that the actuators 102A, 103A, 102B, 103B, 102C, 103C are activated to produce an illusory sensation 104A, 105B, 105C. Embodiments provide that the apparent tactile motion, phantom tactile sensation, and saltation illusions may be combined, in various combinations, into one process to produce several illusions in one experience.

Embodiments provide that Tactile Brush is a process and interaction technique that produces continuous, two-dimensional tactile strokes with a variety of speeds, intensities and directions. According to embodiments, Tactile Brush exploits tactile illusions producing effective tactile sensations using a small number of actuators arranged in a sparse two-dimensional grid. Embodiments provide that the process is currently optimized for rectangular actuator grids of various dimensions. However, embodiments are not limited to rectangular actuator grids, as any arrangement of actuators may be utilized by the Tactile Brush, including, but not limited to, square, circular, triangular, and oval actuator grids. Embodiments of Tactile Brush produce a moving tactile stroke by using apparent motion illusion. A non-limiting example of producing a moving tactile stroke by using apparent motion illusion involves creating a perception of continuous horizontal motion by sequentially vibrating actuators along a horizontal row.

Embodiments provide for an illusory diagonal stroke by generating a virtual actuator by using phantom sensation illusion and then proceed to generate a continuous tactile stroke using apparent motion, treating the virtual actuator just like a normal physical actuator. In addition, embodiments provide for the creation of certain tactile strokes consisting of virtual actuators only.

Referring now to FIGS. 2A-D, therein is depicted different illusory strokes according to embodiments. FIG. 2A shows a rectangular grid 201A of actuators 202A-207A. Vibrating actuators 202A-204A generates the perception 208A of continuous horizontal movement. FIG. 2B shows a rectangular grid 201B of actuators 202B-207B. Vibrating actuators 202B and 207B attempts to generate the perception 208B of a diagonal stroke. However, vibrating the actuators 202B, 207B according to FIG. 2B may fail to produce continuous motion, because the distance between the actuators may be too large. FIG. 2C shows a rectangular grid 201C of actuators 202C-207C. Vibrating actuators 203C and 206C generates virtual actuator 208C using phantom sensation illusion and then proceeds to generate a continuous tactile stroke using apparent motion, such that the virtual actuator is utilized as an actual actuator, creating the perception 209C of continuous horizontal movement. FIG. 2D shows a rectangular grid 201D of actuators 202D-207D and virtual actuator 209D that may be produced according to embodiments and produce tactile stroke 208D.

Figure 3:
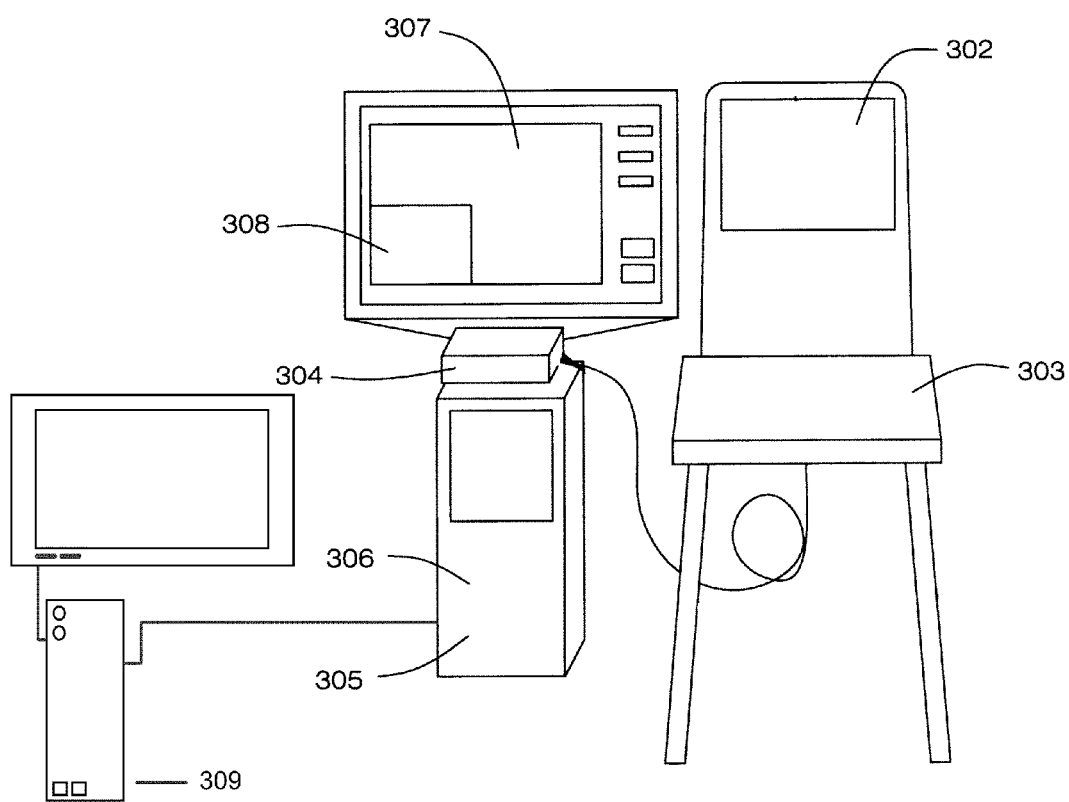
FIG. 3 illustrates an example tactile apparatus.

A non-limiting example of a tactile apparatus according to embodiments utilized C-2 tactors arranged in an equally-spaced 4×3 rectangular grid with inter-tactor spacing of 63 mm (2.5") as illustrated in FIG. 3. The C-2 tactors used in this example are available from Engineering Acoustics, Inc., although similar tactors are applicable. Actuator spacing may be depend on many different factors, including, but not limited to, the specific actuators used or the body contact sites. The tactile apparatus depicted in FIG. 3 is comprised of an array of actuators arranged in a 4×3 actuator grid 302 located on the front side of the back of a chair 303. The tactile apparatus utilized an amplifier 304 and a multi-channel audio card 305 located inside a computing device 306 that controls the actuators 301. The actuators may be controlled by devices other than a multi-channel audio card, including, but not limited to, a dedicated processor or an external controller device. A software application 307 may be configured to provide a user interface for controlling the actuators 301. A Pure Data patch 308 was used in conjunction with a software application 307 for controlling the actuators 301 in this example. In addition, a tactile display apparatus according to embodiments may be in communication with one or more entertainment systems 309. Non-limiting examples of entertainment systems include video game systems, toys, and video and audio based entertainment systems. Embodiments provide that the actuators may be controlled responsive to interaction with the entertainment system 309.

The controlling software may be located on other computing and electronic devices, such as a video game console or toy. In addition, embodiments allow for the transmission of data from the other computing or electronic device to the tactile display apparatus through one or more appropriate communication channels, such as over a wireless network. Furthermore, the tactile display apparatus hardware may be connected to one or more networks, including the Internet. As a non-limiting example, software controlling the tactile display apparatus may be available over the Internet such that a user may control the tactile display apparatus remotely over the Internet.

The 63 mm spacing distance is substantially larger than the two-point threshold for the human back, estimated as 10-50 mm. As such, each actuator is easily localized. In this non-limiting example, the tactors were placed in a finely cut sheet of foam padding and glued to the back of a wooden chair to interact with the back of a user. However, the actuators may be mounted or embedded in a tactile display in any matter suitable for the individual tactile display apparatus. The C-2 tactors provided nearly linear response within the range of human perception: approximately 80-500 Hz with a resonance around 200-300 Hz coinciding with the most sensitive frequency of human perception. The tactors were calibrated and frequency transfer function responses at several vibration intensity levels computed. The combined frequency response may have slight variability across frequencies, compensated for in the software. The intensity of vibration of any actuator may be calibrated for any detection thresholds at the contact site. As a non-limiting example, finger thresholds are much lower than those for the back. Thus, differential calibration may be required. In addition, similar factors may effect the spacing of actuators on a tactile display apparatus.

According to certain embodiments, a tactile apparatus may provide the power to run actuators (or tactors) through a custom-made control board. Each actuator of the haptics surface may be attached to a force sensitive resistor at the rear to monitor contact pressure between the stimulating skin of the user and the actutor. Embodiments may use any sensor capable of measuring coupling between a user and an actuator, including, but not limited to, optical, capacitive, and ultrasound sensors. In addition, the pressure measurements are intended to be used in a closed-loop form to control the intensity of each tactor against the pressure distribution applied by the user skin. According to certain embodiments, the tactors and the sensors were placed in a finely cut sheet of padding foam so that users could not feel the metallic housing when in contact with the tactile display surface and the tactile display surface was glued to the back of a typical chair such that it provided a suitable interface with the skin of the users sitting comfortably on the chair.

Embodiments provide for a number of haptic effects and haptic morphs intended to create static and dynamic effects on user's skin through the tactile display surface. These haptic effects and morphs may be combined or interchanged to create various sensations. The following are non-limiting examples of haptic morphs: (1) onset—turn ON the channel abruptly; (2) reset—turn OFF the channel abruptly; (3) linear rise—rises amplitude linearly; (4) linear decay—decays amplitude linearly; (5) exponential rise—rises amplitude exponentially; (6) exponential decay—decays amplitude exponentially; (7) amplitude modulation—linear modulation of amplitude from the start level to the final level; and (8) frequency modulation—linear modulation of frequency from the start level to the final level.

Stimuli onset asynchrony (SOA) is an important variable for producing apparent tactile motion: when SOA is too small, subsequent stimuli may overlap and may be felt together as a single stimulus. Alternatively, if SOA is too large, the user may feel a series of successive stimuli. According to embodiments, between these ranges is a range of SOA values where the stimuli may be integrated in time and space and felt as continuous directional motion.

Figure 4:
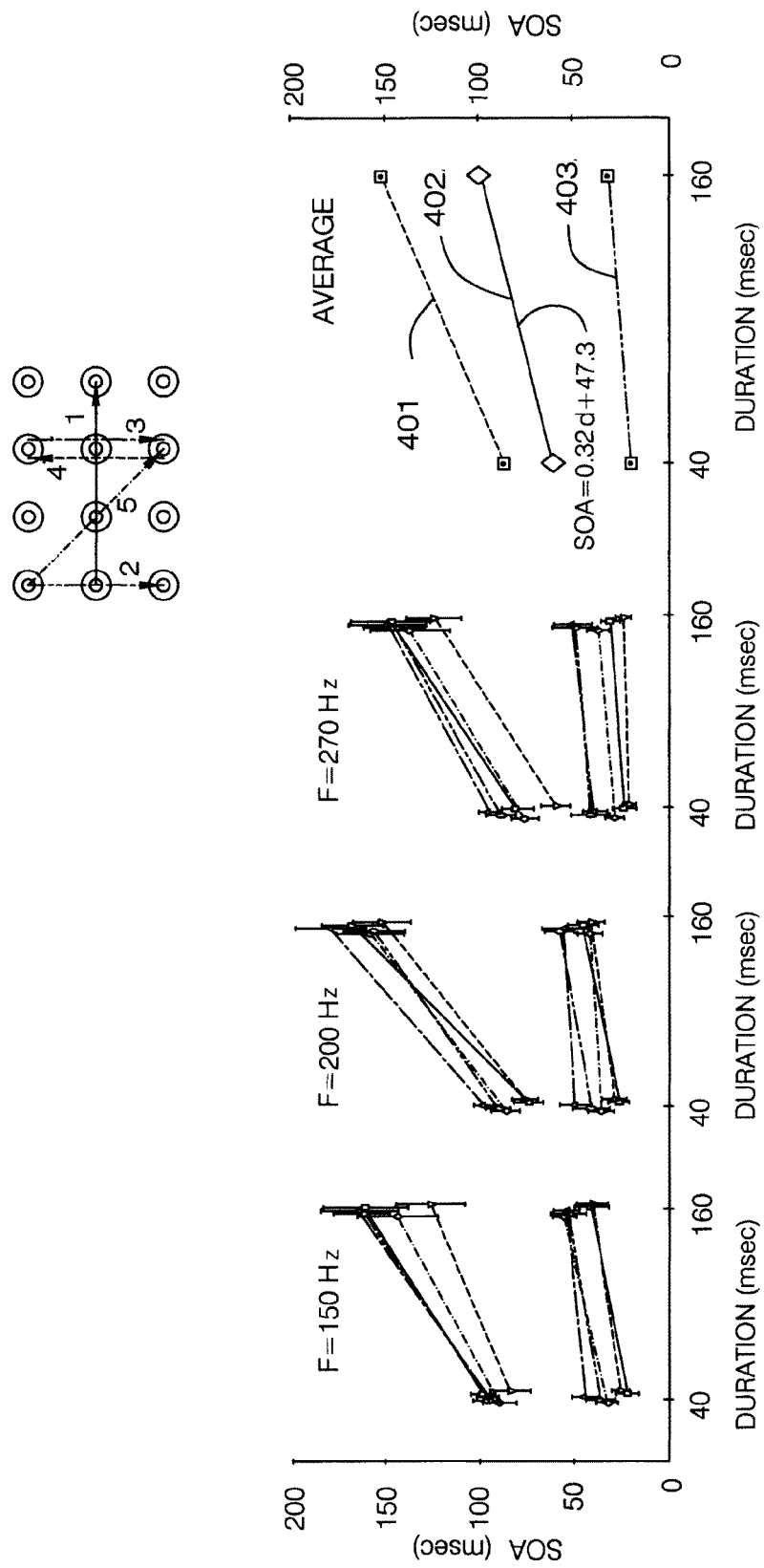
FIG. 4 illustrates upper and lower inter-stimulus onset interval (SOA) threshold values for two duration levels for five actuator patterns.

A second non-limiting illustration involves psychophysical experiments for determining the optimal range of SOA as a function of duration. As illustrated in FIG. 4, five apparent motion patterns were used to determine both lower- and upper-SOA thresholds. Each pattern had a 40-msec ramp-up at the start and at the end. In addition, three frequencies (150, 200, 270 Hz) and two durations (40- and 160-msec) at an amplitude level of 20 dB above sensation level (SL) were used.

Referring again to FIG. 4, therein is presented upper- and lower-SOA threshold values for two duration levels and five patterns, 1-5, averaged across ten participants with standard error bars.

Also illustrated in FIG. 4 are the average thresholds combined for frequency, pattern and participant. As indicated, as long as apparent motion control variables, including, but not limited to, SOA and stimuli duration, fall between the upper SOA threshold 401 and lower SOA threshold 403, the tactile display elicits a perception of continuous motion across the user's back. An average of the upper- and lower-SOA thresholds at the two durations was calculated and a straight average SOA 402 was fit through them. According to embodiments, the equation graphically represented in FIG. 4 defines the optimal SOA function for robust apparent tactile motion.

Following the Pacinian weighted power model, embodiments provide that the perceived intensity of phantom sensation follows summation of energy in Pacinian corpuscles produced by physical actuators:

$$A_v^2 = A_1^2 + A_2^2 \tag{1}$$

Embodiments provide that $A_1$ and $A_2$ are intensities of physical actuators, such as actuators 102B, 103B depicted in FIG. 1B. According to embodiments, equation (1) follows from the Pacinian weighted power model assuming that (a) driving frequencies of physical actuators are the same and (b) skin sensitivity thresholds at locations where the actuators are placed are the same, a reasonable assumption for closely-spaced actuators. The Pacinian weighted power or the energy summation model departs significantly from the standard linear and logarithmic models proposed in Alles, A. S., "Information Transmission by Phantom Sensations", IEEE Trans. on Man-Machine Systems, 1970. 11(1): p. 85-91.

Embodiments provide that two physical actuators driven simultaneously may create a phantom actuator located between them, and the perceived intensity of the phantom actuator depends on, inter alia, the intensities of the physical actuators. The following third non-limiting illustration provides for the estimation of the exact nature of this dependency according to embodiments.

In the third non-limiting illustration, the intensity of the phantom actuator was gradually increased or decreased until it matched the control intensity generated with the real actuator. As the intensity of the physical actuators increases, not only may the phantom intensity change, but so may its location. In the third non-limiting illustration, location was controlled by assuming that the location of a phantom actuator is defined only by the relation of physical intensities such that changing them in equal proportion would change the perceived intensity but not the location. Thus, according to embodiments, intensities of physical actuators may be expressed through a single control variable α:

$$A_1 = \alpha, A_2 = k \cdot \alpha, \tag{2}$$

where k is a constant that defines the location of the virtual actuator. By increasing or decreasing α, phantom intensity may be increased or decreased without affecting its location.

Figure 5:
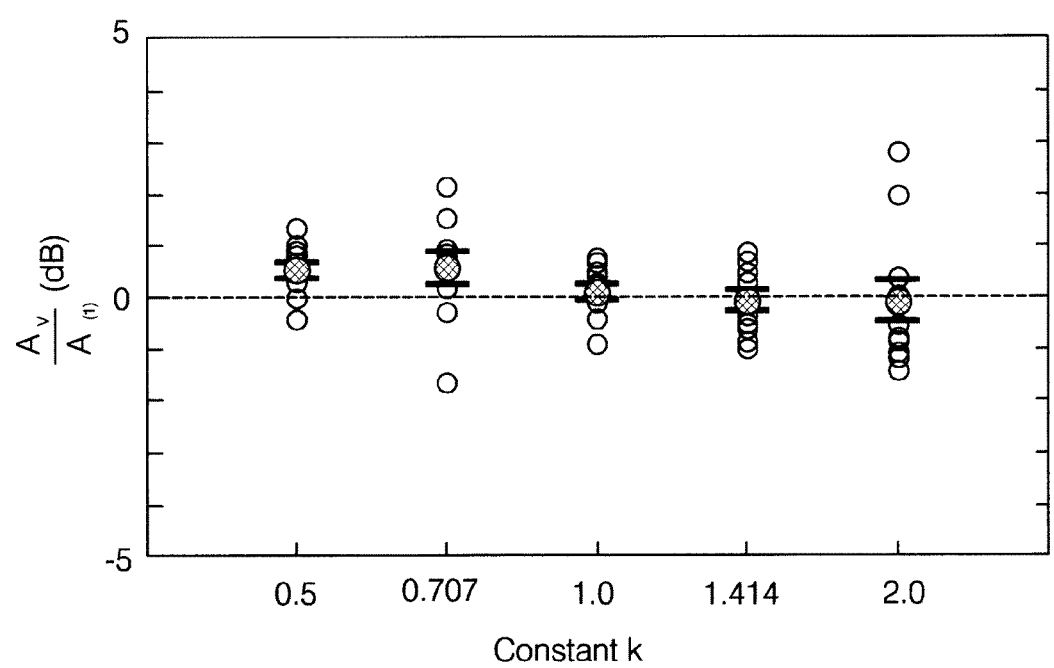
FIG. 5 provides graphical results of perceived intensity of phantom sensation.

The data presented by the third non-limiting illustration indicates that the Pacinian weighted power model accurately describes the intensity of phantom sensation and, therefore, is more preferable than either of the commonly used linear or logarithmic models. The perceived intensity of phantom sensation relative to the real actuator using the energy model is depicted in FIG. 5.

Embodiments provide for the accurate computation of the location of the phantom sensation. According to embodiments, for any point located between adjacent physical actuators, the energy moment due to every actuator must be the same:

$$\beta \cdot A_1^2 = (1-\beta) \cdot A_2^2, \tag{3}$$

where β is the ratio of the distances a 106B and b 107B as depicted in FIG. 1B.

Substituting equation 3 into equation 1 produces:

$$A_1 = \sqrt{1-\beta} \cdot A_v, A_2 = \sqrt{\beta} \cdot A_v \tag{4}$$

Equation (4) allows a virtual phantom to be produced with intensity $A_v$ at any desired location between physical actuators.

A fourth non-limiting illustration involved a psychophysical study that compared linear, logarithmic and energy models. In each trial, participants compared two sequences of virtual actuators generated by two randomly selected models and picked the sequence where actuators were perceived to be more equally spaced. Out of the 120 trials, participants chose the energy model 71% of the time, compared to 43% and 37% for linear and logarithmic models, respectively. The findings indicate that there may be an advantage to the energy model when the accuracy of phantom location is important.

Embodiments provide for a general process that uses the optimal apparent motion function and phantom sensation model to form a universal procedure that draws arbitrary continuous lines on 2D actuator grids. In addition, embodiments provide for a universal tactile architecture that treats tactile grids as a generic content-rendering platform and displays a wide range of tactile drawings on the skin.

Figure 6:
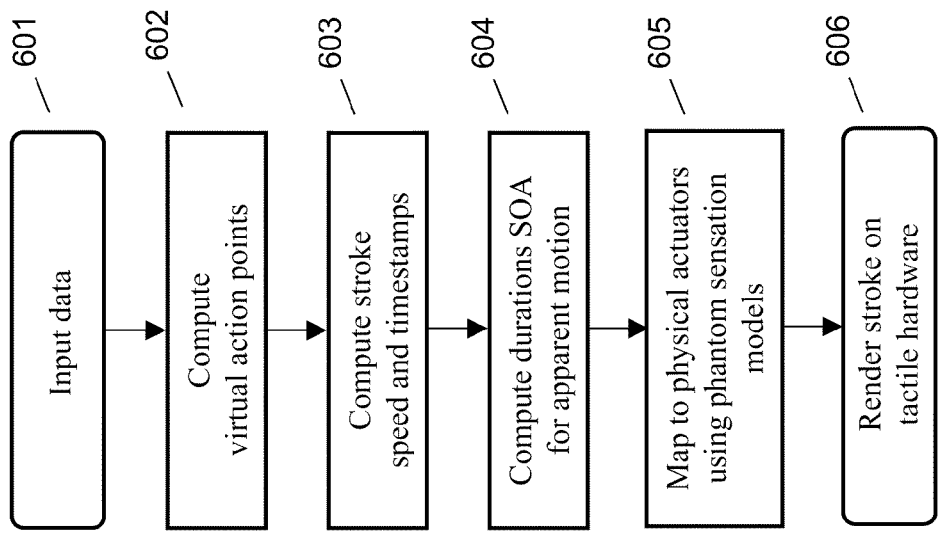
FIG. 6 provides a flow diagram of a Tactile Brush process.

Referring to FIG. 6, therein is depicted a flow diagram of the steps comprising the Tactile Brush process according to an embodiment. Input data 601 is used to compute virtual action points 602. The virtual action points 602 are used to compute stroke speed and timestamps 603. The durations SOA for apparent motion are computed 604 and mapped to physical actuators using phantom sensation models 605. The final step is to render the stroke on the actual tactile hardware 606.

Figure 7A:
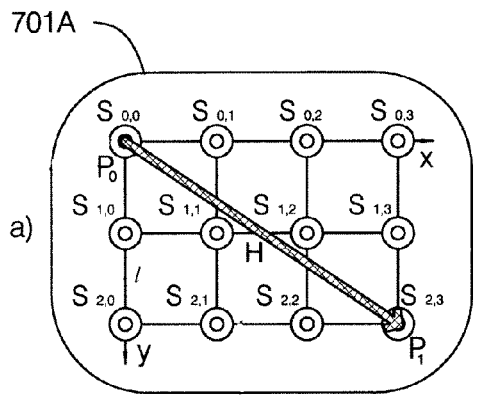
FIGS. 7A-7D illustrate the steps of a Tactile Brush process.

Referring to FIGS. 7A-D, therein is depicted the Tactile Brush process according to an embodiment. As illustrated in FIG. 7A, a rectangular grid 701A of equally-spaced tactile actuators $S=\{s_{i,j}\}$, $i=[0 \ldots m]$, $j=[0 \ldots n]$ is defined where the distance between actuators is 1. Embodiments provide that a first step in the process may be defining virtual actuation points. The tactile stroke H may be defined by (a) starting point $P_0$ and ending point $P_1$, (b) intensity I, (c) frequency F, and (d) the time T to complete the stroke: $H=\{P_0=(x_0, y_0), P_1=(x_1, y_1), I, F, T\}$, where starting and ending points are defined in cm/inches using a coordinate system with the origin at actuator $S_{0,0}$.

Embodiments compute a sequence F of physical actuators, their intensities, onset times (SOA), and actuation durations that will produce a continuous tactile stroke H for k number of required physical actuators:

$$\Gamma|_{n=\overline{1,k}}=\{s_{\eta}, i^n, SOA^n, d^n\} \tag{5}$$

Figure 7B:
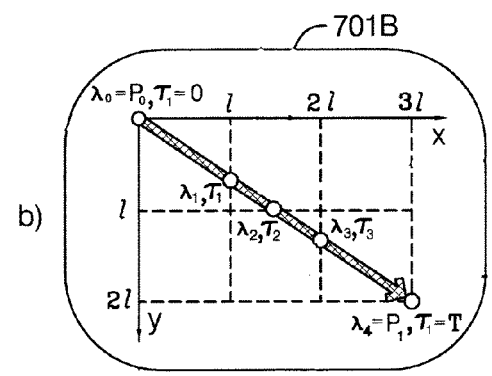

Referring now to FIG. 7B, in a first step, virtual actuation points are determined. FIG. 7B depicts virtual actuation points $\{\lambda_i\}$ as a set of locations used to compute the tactile stroke H. Similar to Bezier curve control points, virtual actuation points $\{\lambda_i\}$ are parametric controls defining stroke H independent of the underlying tactile hardware. As a non-limiting example, some $\lambda_i$ may overlap with physical actuators while others may not. Embodiments compute $\lambda_i$ at the intersections of tactile stroke H and the tactile actuator grid 701B. This choice of $\lambda_1$ easily maps them on the physical actuator space.

Next, the speed of the tactile stroke and timestamps are determined. The speed v of the tactile stroke may be computed by dividing its length by the stroke duration T. Furthermore, to complete the stroke in time T, each $\lambda_i$ must reach its maximum perceived intensity in at least $\Sigma_i$ msec, where:

$$v=\frac{|H|}{T}=\frac{\sqrt{P_1^2-P_0^2}}{T}, \tau_i=\frac{\sqrt{\lambda_1^2-\lambda_0^2}}{v} \tag{6}$$

Figure 7C:
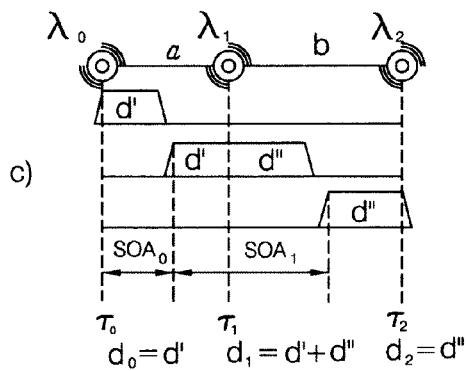

A third step involves determining the durations and onset times for apparent motion. According to embodiments, producing continuous tactile motion along the path of the stroke specified by virtual actuation points involves calculating (a) vibration durations $d_i$ and (b) $SOA_i$ for each $\lambda_i$. FIG. 7C provides a non-limiting example of a timing diagram for a stroke that consists of three actuation points according to an embodiment. Embodiments determine simple relations between $SOA_i$ and $d_i$:

$$SOA_0 + SOA_1 + d'' = T, SOA_0 + d' = \frac{a}{v} \cdot T, \tag{7}$$

and add equations of optimal apparent motion from the psychophysical studies:

$$SOA_0=0.32 \cdot d' + 47.3, SOA_1=0.32 \cdot (d'+d'')+47.3 \tag{8}$$

As such, embodiments provide four linear equations that allow for the solving of four unknowns: two durations and two SOAs. Those having ordinary skill in the art will understand that it is trivial to extend this for solutions for a larger number of $\lambda_i$.

Figure 7D:
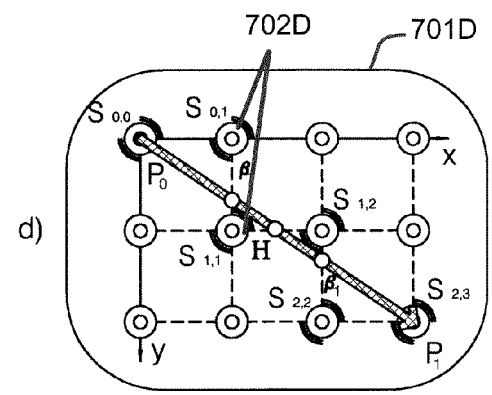

In a fourth step, illustrated in FIG. 7D, the mapping of $\lambda_7$ to the physical actuator grid 701D is accomplished. When $\lambda_i$ overlaps physical actuators, then $\lambda_i = s_{i,j}$. Otherwise, $\lambda_i$ is considered to be a virtual actuator ($\beta_i$) and the closest physical actuators 702D that can produce virtual actuators (e.g. $\beta_1$) at the $\lambda_i$ location may be determined. The intensity of the physical actuators may then be calculated by equation (4).

A fifth non-limiting illustration involves a controlled experiment that evaluated the ability of the Tactile Brush process to effectively mix physical and virtual actuators in a single moving tactile stroke and produce continuous motion. Participants were presented with three tactile patterns: (1) a diagonal stroke with three virtual actuators in the middle, (2) a horizontal stroke that started and ended at virtual actuators and passed over two real actuators, and (3) a vertical stroke made only of virtual actuators. Each pattern was presented twelve times: six times using the Tactile Brush process, and six times strokes were made discrete by setting SOA to 250 msec. As part of the fifth non-limiting illustration, frequency, intensity and velocity were randomly assigned to each stroke. In each trial the participants were asked if they felt a single continuous moving stroke, two strokes or multiple strokes. They felt the sensation only once and responded. Participants were provided with a brief training session to familiarize them with the setup.

Figure 8B:
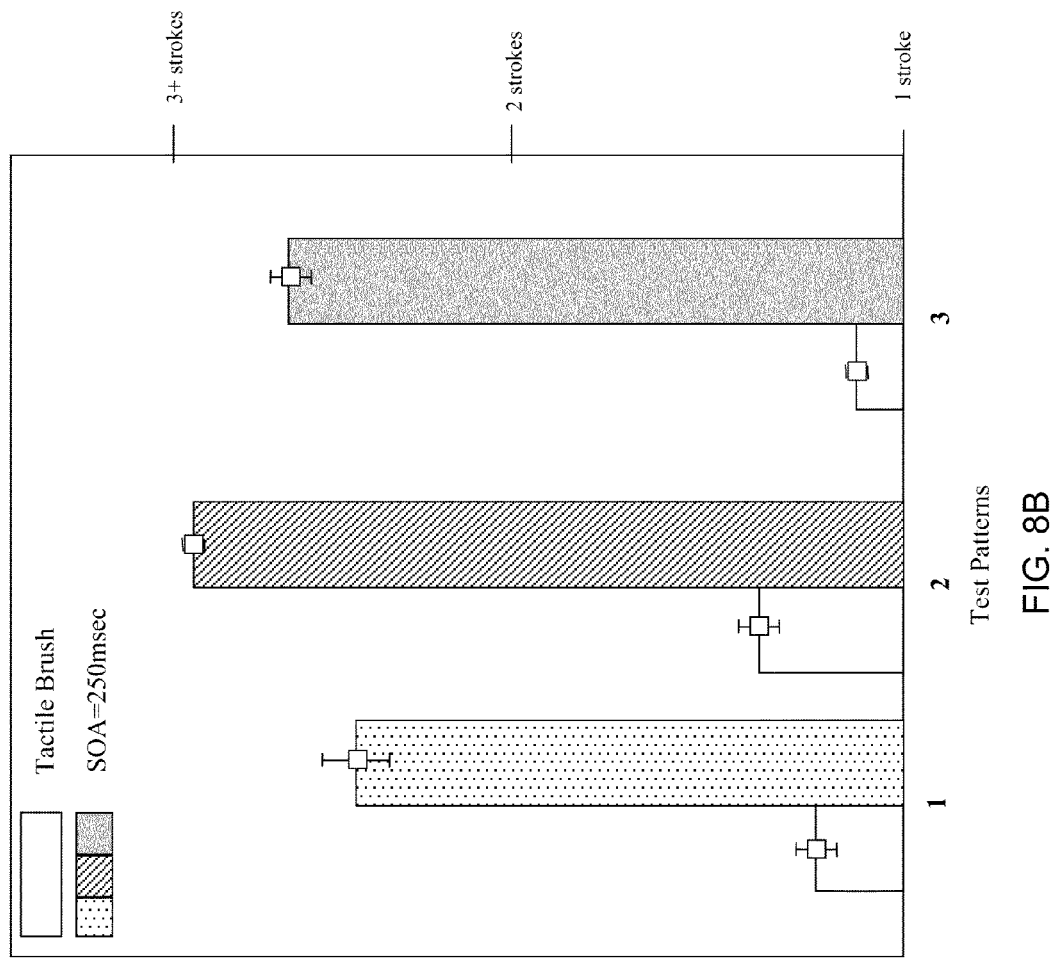
FIGS. 8A and 8B provide graphical results of evaluation of the Tactile Brush process for three test patterns.
Figure 8A:
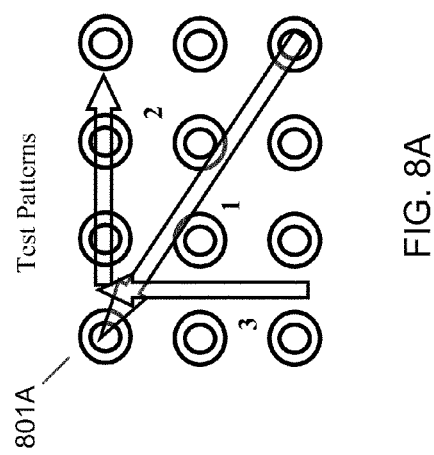

Referring to FIGS. 8A and 8B, therein is depicted the actuator configuration and subjective outcomes of the fifth non-limiting illustration. A 4×3 grid 801A of actuators was used in generating three test patterns 1-3. The results are depicted graphically in FIG. 8B. The results demonstrate that tactile strokes produced by the Tactile Brush process were felt as single strokes by most participants (t(35)=23, p<0.001).

The example process according to embodiments allows for the generation of arbitrary linear moving tactile patterns. It allows for the control of the frequency and amplitude of sensations, as well as speed and direction of motion. The example embodiments described herein are broadly scalable, being based on psychophysical models, such that the same techniques can be easily used on other body sites. In addition, the example embodiments discussed herein may be adapted to other tactile grid configurations. Different vibrating actuators may be used as long as the timings can be controlled within the actuators' capabilities. Furthermore, different grid sizes and actuator topologies may be utilized, depending on the specific application.

Embodiments as described herein may be used in a wide variety of applications and devices. Non-limiting examples include embedding in furniture, clothing, accessories, mobile devices, gloves, and tools. Another non-limiting example involves augmenting visual and audio interaction to create a rich multisensory user experience, leading to a deeper sense of immersion and believability wherein the interactive content of games and movies is seen, heard and felt simultaneously.

A sixth non-limiting illustration involved the development of two video games enhanced with tactile feedback. In this non-limiting example, a tactile feedback hardware platform similar to that depicted in FIG. 3 was used.

As part of the sixth non-limiting illustration, two games were implemented. In a "robot" game, a user navigates a remote-controlled robot through a dynamic environment from a starting point to a final destination. The user navigates static and dynamic obstacles and passes challenges, many of which provide unique tactile feedback to enhance the user experience. The robot game demonstrates the use of tactile feedback in character control games. In a "car" game, the user maneuvers a car to reach a finish line within a set time limit. The car game demonstrates how effectively simulator games may be enhanced with tactile feedback.

Referring now to FIGS. 9A-9I, therein are depicted images of the games and various sensations according to embodiments as carried out in the sixth non-limiting illustration. FIG. 9A shows a graphic 901A of an explosion occurring in the car game and the actuator grid 902A triggering configuration used to produce the corresponding tactile sensation. FIG. 9B shows a graphic 901B of rain drops falling in the robot game and the actuator grid 902B triggering configuration used to produce the sensation of falling rain drops. An image from the car game wherein the car is colliding with a box that flies over the car is shown in FIG. 9C with a graphic 901C from the game and the corresponding actuator grid 902C configuration. FIG. 9D involves the sensation of flying in the robot game. A graphic 901D from the game shows the robot flying and the actuator grid 902D illustrates the corresponding configuration to produce this sensory effect. FIG. 9E provides a graphic 901E from the robot game wherein the robot is refueling and the corresponding actuator grid 902E configuration. FIG. 9F includes a graphic 901F from the car game of a missile being shot past the right side of the car and the corresponding actuator grid configuration 902F. FIG. 9G provides a graphic 901G of shooting from the robot game and the associated actuator grid 902G. FIG. 9H shows a graphic of scanning from the robot game and the corresponding actuator grid 902H. FIG. 9I shows a graphic 901I demonstrating maneuvering and stability from the car game and the corresponding actuator grid 902I configuration.

In the sixth non-limiting illustration, tactile feedback was integrated with gaming interaction in four overlapping categories: (1) egocentric tactile feedback, (2) environmental and atmospheric tactile feedback, (3) simulating object interactions, and (4) game mechanics, magic, and innovative uses. Embodiments are not limited to the four tactile feedback categories specified for the sixth non-limiting illustration; rather, these categories are used for illustrative purposes only.

The egocentric tactile feedback category includes tactile feedback that informs the user of changes in the internal state of the game character. Non-limiting examples include the level of health, feelings of tiredness or injury, feeling weight on one or the other side, feeling sweaty, heart beat, injuries, and feedback from virtual gear. FIGS. 9E and 9I demonstrate tactile feed back in this category. As demonstrated by the sixth non-limiting illustration, embodiments increase self-awareness by enhancing immersion and translating virtual character states into the user's physical state, and reducing sensory overload.

Environmental and atmospheric tactile feedback gives the user information about the surrounding environment, but not interactions with objects. Examples include, but are not limited to, sensing background music, experiencing weather (FIG. 9B), oxygen levels, gravity, feeling objects on the ground and outside the range of vision and sensing characters approaching from behind.

Simulating object interactions is the most direct and obvious category of interaction. It simulates interactions between the user and game objects, other users and environments. This category includes a wide range of effects and can be very specific to the game. Examples include, but are not limited to, objects closely passing by (FIG. 9F); shooting and getting hit; collisions and type, size and flow of impacts (FIGS. 9A and 9C); the recoil from a gun or missile launcher (FIG. 9G); objects crawling, rolling, flowing and moving on the skin; explosions; cutting; and electrocution.

The game mechanics, magic, innovative uses category arises from the notion that games are not only based on reality, but also include many new and innovative experiences, including tools and game mechanics that can be expanded with tactile feedback. Examples include, but are not limited to body scans (FIG. 9H), an increased perception of free-fall or flying (FIG. 9D), depth perception, shrinking, growing, zooming, glowing, converging and diverging, getting feedback on spells, and navigating through a portal. In this category, all of these mappings are artificial and the user can learn them very quickly, without expecting to feel a real world equivalent.

The Tactile Brush process creates two-dimensional, high resolution, continuous moving sensations on the skin surface. According to embodiments, illusory sensations are created in between physical actuators. As a non-limiting example, if two actuators are on the skin and are vibrated at a frequency and timing according to embodiments, one device in between the two actuators and not two separate devices will be perceived. The location of the illusory device may be controlled by changing the properties of vibration of the physical actuators. A stimulation device may be an electronic or mechanical device that generates vibrations, motions, or forces, including, but not limited to, tactors, motors, voice coils, solenoids, air nozzles, water sprays ultrasonic devices, electromagnetic, and piezoelectric actuators.

Embodiments provide that simultaneous static and dynamic sensations, such as buzz and stroke sensations, may have the same or different vibration parameters, including, but not limited to, frequency, intensity, timing, and duration. Embodiments of the Tactile Brush process described as utilizing two actuators may be extended to three or more actuators according to further embodiments. In addition, embodiments provide that the Pacinian weighted power model may be extended to predict the location and intensity of each physical actuator to create an illusion of phantom sensations.

The intensity of the stimulation devices of a tactile display may need to be calibrated to adopt to different situations. As a non-limiting example, different intensities may be required for differences in clothing thickness of tactile display users.

According to embodiments, an intensity function may be derived involving the pressure of the stimulation devices against the skin as determined by a sensor. Non-limiting examples of sensors include optical or pressure sensors that may determine how well the user is in contact with a specific stimulation device. The Tactile Brush process may be modified for variances in user contact with stimulation devices. As a non-limiting example, the intensity of the vibration, motion, or force of the stimulation device may be increased as the skin of the user is farther away from the stimulation device. Another non-limiting example involves user movements altering contact with the tactile display, such as a user shifting positions. In this scenario, embodiments provide for dynamically modifying the Tactile Brush process to adjust to the new user contact conditions.

Embodiments provide for the generation of an illusory bar sensation. A non-limiting example of the bar sensation is illustrated in FIG. 9H. Embodiments provide that creating a bar sensation, as opposed to a single point sensation, involves controlling the intensity and number of stimulation devices, such that more intensity and more stimulation devices are required to create a bar sensation as opposed to the illusion of a single point sensation. In addition, embodiments provide that the timing of the actuators may also define whether a point is created or an object, such as a bar, is created. According to embodiments, at least three stimulation devices are required to generate a bar sensation as well as an increase in intensity over that required for an illusion of a single point.

Additional embodiments provide for controlling the thickness of an illusory line sensed by a user interacting with a tactile display. As a non-limiting example, the thickness of a line may be controlled through the regulation of the number and intensity of active stimulation devices. In addition, embodiments provide for the aggregation of illusory sensations to create high order illusory shapes, including, but not limited to, circles, squares, the breaking up or coming together of a shape, the movement, crossing and coming together of multiple lines. A tactile display according to embodiments may generate curves by controlling the velocity of the sensations, such that maintaining a constant sensation velocity may produce the effect of curves on the skin. As a non-limiting example, generating a square sensation and controlling the actuators at the same velocity will produce the illusion of a circle in between the confines of the square.

Figure 10:
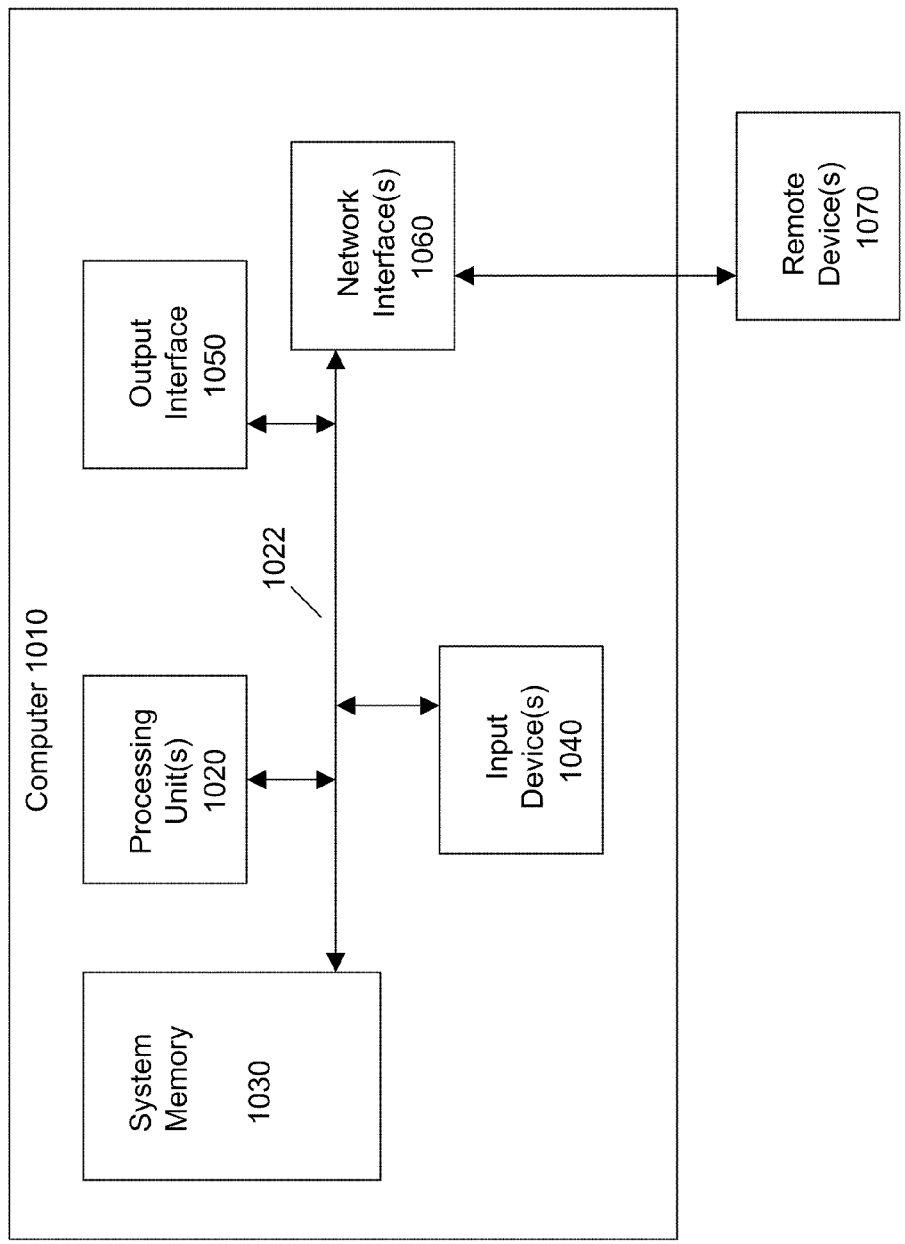
FIG. 10 illustrates an example computer system.

Referring to FIG. 10, it will be readily understood that embodiments can be implemented using any of a wide variety of devices or combinations of devices. An example device that may be used in implementing one or more embodiments includes a computing device in the form of a computer 1010. In this regard, the computer 1010 may execute program instructions configured to perform steps involved in processing data regarding tracking objects/individuals within a show space, receiving and recording video data during a show, selecting an appropriate media content for inclusion in a custom media product, and perform other functionality of the embodiments, as described herein.

Components of computer 1010 may include, but are not limited to, processing units 1020, a system memory 1030, and a system bus 1022 that couples various system components including the system memory 1030 to the processing unit 1020. Computer 1010 may include or have access to a variety of computer readable media. The system memory 1030 may include computer readable storage media in the form of volatile and/or nonvolatile memory such as read only memory (ROM) and/or random access memory (RAM). By way of example, and not limitation, system memory 1030 may also include an operating system, application programs, other program modules, and program data.

A user can interface with (for example, enter commands and information) the computer 1010 through input devices 1040, which can include remote input devices. Alternatively, a computer may run in a fully or semi-automated or unattended mode. A monitor or other type of device can also be connected to the system bus 1022 via an interface, such as an output interface 1050. In addition to a monitor, computers may also include other peripheral output devices. The computer 1010 may operate in a networked or distributed environment using logical connections to one or more other remote computers or databases, such as a remotely located digital storage system configured to store video data, custom media content, stock media content, and/or tracking data. The logical connections may include a network, such local area network (LAN) or a wide area network (WAN), but may also include other networks/buses.

It should be noted that certain embodiments may be implemented as a system, method or computer program product. Accordingly, aspects of the invention may take the form of an entirely hardware embodiment, an entirely software embodiment (including firmware, resident software, micro-code, et cetera) or an embodiment combining software and hardware aspects. Furthermore, aspects of the invention may take the form of a computer program product embodied in one or more computer readable medium(s) having computer readable program code embodied therewith.

Any combination of one or more computer readable medium(s) may be utilized. The computer readable medium may be a non-signal computer readable storage medium. A computer readable storage medium may be, for example, but not limited to, an electronic, magnetic, optical, electromagnetic, infrared, or semiconductor system, apparatus, or device, or any suitable combination of the foregoing. More specific examples include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative embodiments have been described herein with reference to the accompanying drawings, it is to be understood that the embodiments are not limited to those precise embodiments, and that various other changes and modifications may be affected therein by one skilled in the art without departing from the scope or spirit of the disclosure.

What is claimed is:

1. A method comprising:
controlling one or more characteristics of a two-dimensional array of a plurality of actual physical stimulation devices configured to generate a two-dimensional phantom tactile sensation, wherein the phantom tactile sensation is a result of one or more additional illusory stimulation devices perceivable by a user and having a higher resolution than the actual physical stimulation devices and wherein the one or more additional illusory stimulation devices are perceived at a location distinct from the plurality of actual physical stimulation devices;
generating one or more tactile sensations using the plurality of actual physical stimulation devices and the one or more additional illusory stimulation devices; and
controlling the one or more tactile sensations such that the one or more tactile sensations are perceivable by a user at a plurality of positions.

2. The method according to claim 1, wherein the one or more are comprised of frequency, duration, and intensity.

3. The method according to claim 1, wherein the plurality of actual physical stimulation devices comprises air nozzles, water sprays, and ultrasonic devices.

4. The method according to claim 1, wherein the plurality of actual physical stimulation devices comprises electromagnetic and piezoelectric actuators.

5. The method according to claim 1, further comprising arranging the plurality of actual physical stimulation devices in one or more grid topologies.

6. The method according to claim 1, further comprising generating one or more continuous motion illusory tactile sensations by sequentially activating one or more of the plurality of actual physical stimulation devices.

7. The method according to claim 1, wherein the one or more tactile sensations comprises single points, stationary lines, moving lines, bars, curves, squares, circles, and falling drops.

8. The method according to claim 1, further comprising controlling a sensation area of the one or more tactile sensations.

9. The method according to claim 1, further comprising:
configuring a tactile display apparatus, the tactile display apparatus comprising:
one or more interfaces;
one or more computing devices; and
one or more control applications running on the one or more computing devices, the one or more control applications being configured to control the plurality of actual physical stimulation devices;
wherein the plurality of actual physical stimulation devices are integrated within the one or more interfaces.

10. The method according to claim 9, wherein the one or more interfaces comprise one or more chairs, one or more articles of clothing, one or more mobile devices, and one or more video game controllers.

11. The method according to claim 9, further comprising:
configuring the tactile display apparatus to communicate with one or more entertainment systems;
wherein the tactile display apparatus generates the one or more tactile sensations responsive to interaction with the one or more entertainment systems.

12. The method according to claim 11, wherein the one or more entertainment systems comprise a video game system, a toy, and a movie entertainment system.

13. A system comprising:
a two-dimensional array of a plurality of actual physical stimulation devices; and
one or more control devices configured to:
control one or more characteristics of the two-dimensional array of a plurality of actual physical stimulation devices configured to generate a two-dimensional phantom tactile sensation, wherein the phantom tactile sensation is a result of one or more additional illusory stimulation devices perceivable by a user and having a higher resolution than the actual physical stimulation devices and wherein the one or more additional illusory stimulation devices are perceived at a location distinct from the plurality of actual physical stimulation devices;
generate one or more tactile sensations using the plurality of actual physical stimulation devices and the one or more additional illusory stimulation devices; and
control the one or more tactile sensations such that the one or more tactile sensations are perceivable by a user at a plurality of positions.

14. The system according to claim 13, wherein the one or more characteristics comprise frequency, duration, and intensity.

15. The system according to claim 13, wherein the plurality of actual physical stimulation devices comprises air nozzles, water sprays, ultrasonic devices, and electrotactile devices.

16. The system according to claim 13, wherein the plurality of actual physical stimulation devices comprises electromagnetic and piezoelectric actuators.

17. The system according to claim 13, wherein the plurality of actual physical stimulation devices is arranged in one or more grid topologies.

18. The system according to claim 13, wherein the one or more control devices are configured to generate a continuous motion illusory sensation by sequentially activating one or more of the plurality of actual physical stimulation devices.

19. The system according to claim 13, wherein the one or more tactile sensations comprise single points, stationary lines, moving lines, bars, curves, squares, circles, and falling drops.

20. The system according to claim 13, wherein the one or more control devices control a sensation area of the one or more tactile sensations.

21. The system according to claim 13, further comprising:
a tactile display apparatus, the tactile display apparatus comprising:
one or more interfaces;
one or more computing devices; and
one or more control applications running on the one or more computing devices, the one or more control applications being in communication with the one or more control devices;
wherein the plurality of actual physical stimulation devices are integrated within the one or more interfaces; and
wherein the one or more control applications are configured to operate the one or more control devices.

22. The system according to claim 21, wherein the one or more interfaces comprise one or more chairs, one or more articles of clothing, one or more mobile devices, and one or more video game controllers.

23. The system according to claim 21, further comprising:
one or more entertainment systems;
wherein the tactile display apparatus is configured to communicate with the one or more entertainment systems and generate the one or more tactile sensations responsive to interaction with the one or more entertainment systems.

24. A computer program product comprising:
a non-transitory computer readable storage medium having computer readable program code embodied therewith, the computer readable program code comprising:
computer readable program code configured to control one or more characteristics of a two-dimensional array of a plurality of actual physical stimulation devices configured to generate a two-dimensional phantom tactile sensation, wherein the phantom tactile sensation is a result of one or more additional illusory stimulation devices perceivable by a user and having a higher resolution than the actual physical stimulation devices and wherein the one or more additional illusory stimulation devices are perceived at a location distinct from the plurality of actual physical stimulation devices; and
computer readable program code configured to generate one or more tactile sensations using the plurality of actual physical stimulation devices and the one or more additional illusory stimulation devices;
computer readable program code configured to control the one or more tactile sensations such that the one or more tactile sensations are perceivable by a user at a plurality of positions.

* * * * *